(12) United States Patent
Hokoi et al.

(10) Patent No.: US 11,535,121 B2
(45) Date of Patent: Dec. 27, 2022

(54) ELECTRIC POWERED VEHICLE AND CONTROL METHOD FOR ELECTRIC POWERED VEHICLE

(71) Applicant: Toyota Jidosha Kabushiki Kaisha, Toyota (JP)

(72) Inventors: Koji Hokoi, Toyota (JP); Yu Nakao, Toyota (JP); Yoshimitsu Takahashi, Miyoshi (JP); Yoshihiro Uchida, Nagakute (JP); Kazuki Furuta, Toyota (JP); Kazuto Roppongi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 397 days.

(21) Appl. No.: 16/260,542

(22) Filed: Jan. 29, 2019

(65) Prior Publication Data

US 2019/0232815 A1   Aug. 1, 2019

(30) Foreign Application Priority Data

Jan. 30, 2018 (JP) .............................. JP2018-013545

(51) Int. Cl.
*B60L 58/16* (2019.01)
*B60W 20/13* (2016.01)
*B60L 58/13* (2019.01)
*B60L 50/61* (2019.01)
*B60W 20/40* (2016.01)

(52) U.S. Cl.
CPC .............. *B60L 58/16* (2019.02); *B60L 50/61* (2019.02); *B60L 58/13* (2019.02); *B60W 20/13* (2016.01); *B60W 20/40* (2013.01)

(58) Field of Classification Search
CPC .......... B60L 58/16; B60L 58/13; B60L 58/14; B60L 50/61; B60L 50/16; B60L 53/14;
(Continued)

(56) References Cited

U.S. PATENT DOCUMENTS 9,744,874 B2 * 8/2017 Obata ................. B60L 11/1862
2009/0101421 A1 * 4/2009 Oyobe ................. B60W 10/08
180/65.29
(Continued)

FOREIGN PATENT DOCUMENTS

CN   106004473 A   10/2016
EP   2168828 A1 * 3/2010 ............ B60W 10/06
(Continued)

*Primary Examiner* — Peter D Nolan
*Assistant Examiner* — Michael F Whalen
(74) *Attorney, Agent, or Firm* — Dinsmore & Shohl LLP

(57) ABSTRACT

An ECU switches a control mode to an HV mode when an SOC decreases to a lower limit during an EV mode. The ECU calculates an evaluation value $\Sigma D$ of high-rate deterioration indicating a deterioration component of a secondary battery due to non-uniformity in salt concentration in a battery. The ECU executes high-rate deterioration inhibiting control when the HV mode is currently selected and when the battery is evaluated as deteriorating based on the evaluation value $\Sigma D$, the high-rate deterioration inhibiting control being control for increasing the SOC by making a control target of the SOC higher than the lower limit of the SOC. On the other hand, the ECU does not execute the high-rate deterioration inhibiting control when the EV mode is currently selected.

5 Claims, 6 Drawing Sheets

(58) Field of Classification Search
CPC ... B60L 11/1862; B60W 20/13; B60W 20/40; B60W 20/00; B60W 20/20; B60W 2510/248; B60W 2710/244; B60W 10/06; B60W 10/08; B60W 10/26; Y02T 10/7072; Y02T 10/70; Y02T 10/62; Y02T 90/14; B60K 6/445
See application file for complete search history.

(56) References Cited

U.S. PATENT DOCUMENTS

| | | | |
|---|---|---|---|
| 2012/0016547 A1* | 1/2012 | Aridome | B60L 50/61 701/22 |
| 2013/0173098 A1* | 7/2013 | Takagi | B60W 10/08 701/22 |
| 2013/0211641 A1* | 8/2013 | Fujii | B60L 3/12 701/22 |
| 2015/0352962 A1* | 12/2015 | Hokoi | B60W 50/085 290/16 |
| 2016/0236586 A1* | 8/2016 | Soo | B60L 58/13 |
| 2016/0280093 A1* | 9/2016 | Obata | B60L 58/13 |
| 2016/0339903 A1* | 11/2016 | Hokoi | B60K 6/445 |
| 2017/0028868 A1* | 2/2017 | Minamiura | B60L 58/15 |
| 2019/0232815 A1* | 8/2019 | Hokoi | B60L 58/16 |

FOREIGN PATENT DOCUMENTS

| | | | | |
|---|---|---|---|---|
| EP | 3072729 A2 * | 9/2016 | | B60L 3/0046 |
| JP | 2013-106481 A | 5/2013 | | |

* cited by examiner

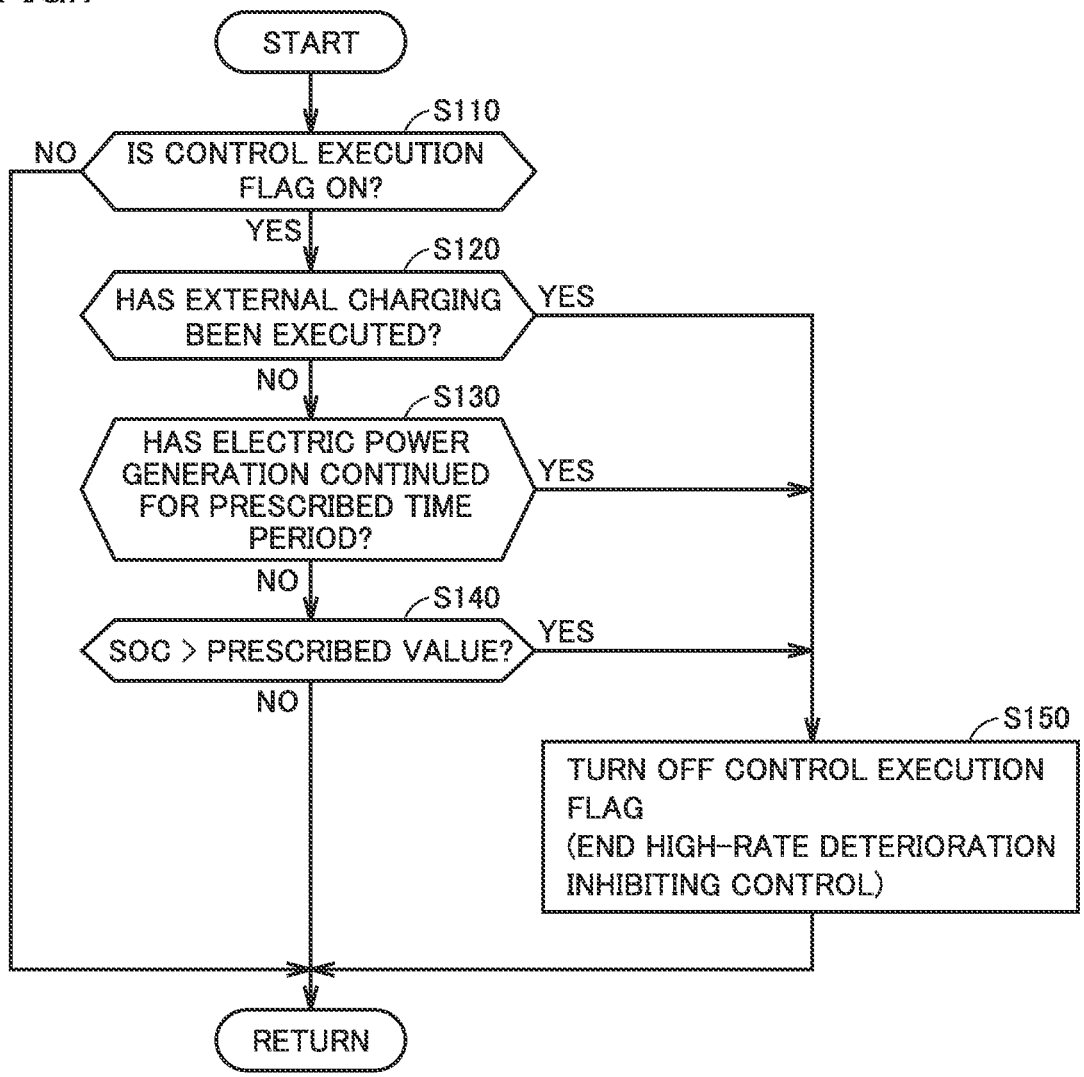

ELECTRIC POWERED VEHICLE AND CONTROL METHOD FOR ELECTRIC POWERED VEHICLE

CROSS REFERENCE TO RELATED APPLICATIONS

This nonprovisional application claims priority to Japanese Patent Application 2018-013545 filed on Jan. 30, 2018 with the Japan Patent Office, the entire contents of which are hereby incorporated by reference.

BACKGROUND

Field

The present disclosure relates to an electric powered vehicle and a control method for an electric powered vehicle, and relates more specifically to a control technique of inhibiting high-rate deterioration occurring in a secondary battery mounted on an electric powered vehicle.

Description of the Background Art

When the salt concentration in an electrolytic solution of a secondary battery becomes non-uniform as the secondary battery is charged with electric power or electric power is discharged from the secondary battery, the internal resistance of the secondary battery increases. Such an increase in the internal resistance due to the non-uniform salt concentration is referred to as, for example, "high-rate deterioration", in distinction from aged deterioration of a material forming the secondary battery.

Japanese Patent Laying-Open No. 2013-106481 discloses that when high-rate deterioration occurs in a secondary battery mounted on a hybrid vehicle, a target SOC indicating a control target of a state of charge (SOC) of the secondary battery is made higher than a target SOC at the normal time (when there is no high-rate deterioration), in order to ensure a constant battery output and a constant travelling distance.

In the vehicle disclosed in the above-described publication, when the SOC of the secondary battery is higher than the target SOC, motor travelling (hereinafter, referred to as "EV travelling") using electric power stored in the secondary battery is basically performed until the SOC decreases to the target SOC. Then, when the SOC decreases to the target SOC, hybrid travelling (hereinafter, also referred to as "HV travelling") in which the vehicle travels while controlling the SOC to the target SOC by operating an electric power generation mechanism including an engine and the like as appropriate is performed.

If the target SOC of the secondary battery is made higher than the target SOC at the normal time without any exception when the high-rate deterioration occurs in such a vehicle, a distance over which the EV travelling is possible can become shorter unnecessarily, or the EV travelling can become impossible.

SUMMARY

The present disclosure has been made to solve the above-described problem, and an object of the present disclosure is to provide an electric powered vehicle having a secondary battery mounted thereon, in which high-rate deterioration of the secondary battery is inhibited and a decrease in EV travelling distance is inhibited.

An electric powered vehicle according to the present disclosure includes: a vehicle drive apparatus configured to generate vehicle drive power by receiving electric power and to generate electric power; a secondary battery configured to exchange electric power with the vehicle drive apparatus; and a controller. The controller is configured to switch a control mode to an HV mode when an SOC of the secondary battery decreases to a lower limit during an EV mode, the HV mode being a mode in which the SOC is controlled to the lower limit, the EV mode being a mode in which the SOC is consumed. The controller is further configured to calculate an evaluation value (ED) indicating a degree of deterioration (high-rate deterioration) of the secondary battery due to non-uniformity in salt concentration in the secondary battery. The controller is further configured to execute deterioration inhibiting control (high-rate deterioration inhibiting control) when the HV mode is selected and when the secondary battery is evaluated as deteriorating based on the evaluation value (ED), the deterioration inhibiting control being control for increasing the SOC by making a control target of the SOC higher than the lower limit of the SOC. The controller is further configured not to execute the deterioration inhibiting control when the EV mode is selected.

A control method according to the present disclosure is a control method for an electric powered vehicle. The electric powered vehicle includes: a vehicle drive apparatus configured to generate vehicle drive power by receiving electric power and to generate electric power; and a secondary battery configured to exchange electric power with the vehicle drive apparatus. The electric powered vehicle is configured to switch a control mode to an HV mode when an SOC of the secondary battery decreases to a lower limit during an EV mode, the HV mode being a mode in which the SOC is controlled to the lower limit, the EV mode being a mode in which the SOC is consumed. The control method includes: calculating an evaluation value (ED) indicating a degree of deterioration (high-rate deterioration) of the secondary battery due to non-uniformity in salt concentration in the secondary battery; and executing deterioration inhibiting control (high-rate deterioration inhibiting control) when the HV mode is selected and when the secondary battery is evaluated as deteriorating based on the evaluation value ($\Sigma$D), the deterioration inhibiting control being control for increasing the SOC by making a control target of the SOC higher than the lower limit of the SOC. The deterioration inhibiting control is not executed when the EV mode is selected.

The high-rate deterioration has the property of being accelerated when the secondary battery is used in a low-SOC range. This is because in the low-SOC range, expansion and contraction of the negative electrode of the battery become large and an electrolytic solution in a battery cell is more easily pushed out, and thus, the salt concentration in a battery cell surface more easily becomes non-uniform. In the electric powered vehicle and the control method according to the present disclosure, the deterioration inhibiting control (high-rate deterioration inhibiting control) for increasing the SOC by making the control target of the SOC higher than the lower limit of the SOC is executed when the HV mode in which the SOC is controlled to the lower limit is currently selected and when the secondary battery is evaluated as deteriorating based on the evaluation value ($\Sigma$D). This makes it possible to inhibit acceleration of the high-rate deterioration due to the SOC controlled to the lower limit.

The high-rate deterioration also has the property of being accelerated particularly when an electric current in a charging direction flows in the low-SOC range. The high-rate deterioration caused by the flow of the electric current in the charging direction turns toward recovery when an electric current in a discharging direction flows continuously. In the electric powered vehicle and the control method according to the present disclosure, when the EV mode is currently selected, the deterioration inhibiting control (high-rate deterioration inhibiting control) is not executed even if the evaluation value ($\Sigma D$) reaches a threshold value. In the EV mode in which the SOC is consumed, the ratio of discharging is greater than charging, and thus, recovery of the high-rate deterioration can be expected as a result of continuous discharging. Since the deterioration inhibiting control is not executed, the EV travelling is possible until the SOC reaches the lower limit, and thus, the EV travelling distance can be ensured.

As described above, in the electric powered vehicle and the control method according to the present disclosure, the high-rate deterioration of the secondary battery can be inhibited and a decrease in EV travelling distance can be inhibited.

The case in which the HV mode is currently selected and the secondary battery is evaluated as deteriorating based on the evaluation value ($\Sigma D$) includes a case in which the secondary battery is evaluated as deteriorating based on the evaluation value when the HV mode is currently selected, and a case in which the control mode is switched from the EV mode to the HV mode when the secondary battery is evaluated as deteriorating based on the evaluation value.

The controller may be configured to further switch the control mode to an HVS mode in which the SOC is maintained higher than the lower limit in accordance with a user's request. The controller may be configured not to execute the deterioration inhibiting control when the HVS mode is selected.

When the HVS mode is currently selected, the SOC is maintained higher than the lower limit, and thus, progress of the high-rate deterioration is inhibited. In addition, when the HVS mode is selected, it is conceivable to ensure the SOC to make the subsequent EV travelling possible. However, if the deterioration inhibiting control is executed and the control target of the SOC is raised in this case, the EV travelling distance can become shorter, or the EV travelling can become impossible. Accordingly, the deterioration inhibiting control is not executed when the HVS mode is currently selected. This makes it possible to inhibit progress of the high-rate deterioration and ensure the EV travelling distance.

The electric powered vehicle may further include a charging device configured to charge the secondary battery by a power source external to the vehicle. When charging of the secondary battery using the charging device (hereinafter, also referred to as "external charging") is executed, the controller may be configured to end the deterioration inhibiting control if the deterioration inhibiting control is in execution.

When external charging is executed, the user expects that a sufficient EV travelling distance is ensured. However, if the deterioration inhibiting control is in execution (continued), the control target of the SOC is high and thus the EV travelling distance becomes short. In addition, when a difference between the SOC and the control target of the SOC is displayed to the user, the user can have an uncomfortable feeling that an amount of stored electric power is insufficient in spite of execution of external charging. Accordingly, when external charging is executed, the deterioration inhibiting control is ended. This makes it possible to ensure the EV travelling distance after external charging and inhibit the user's uncomfortable feeling about display of a remaining amount of the SOC.

When electric power generation by the vehicle drive apparatus continues for a prescribed time period, the controller may be configured to end the deterioration inhibiting control if the deterioration inhibiting control is in execution.

When electric power generation by the vehicle drive apparatus continues, such as, for example, when travelling on a downhill slope continues, the user expects that a sufficient amount of electric power is recovered and a sufficient EV travelling distance is ensured. However, if the deterioration inhibiting control is in execution (continued), the EV travelling distance can become shorter, and the user can have an uncomfortable feeling about display of the remaining amount of the SOC described above, similarly to the above-described case of external charging. Accordingly, when electric power generation by the vehicle drive apparatus continues for the prescribed time period, the deterioration inhibiting control is ended. This makes it possible to ensure the EV travelling distance, for example, after travelling on a downhill slope continues, and inhibit the user's uncomfortable feeling about display of the remaining amount of the SOC.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a flowchart illustrating an example of determination as to whether or not to end the high-rate deterioration inhibiting control.

DESCRIPTION OF THE EMBODIMENTS

Figure 1:
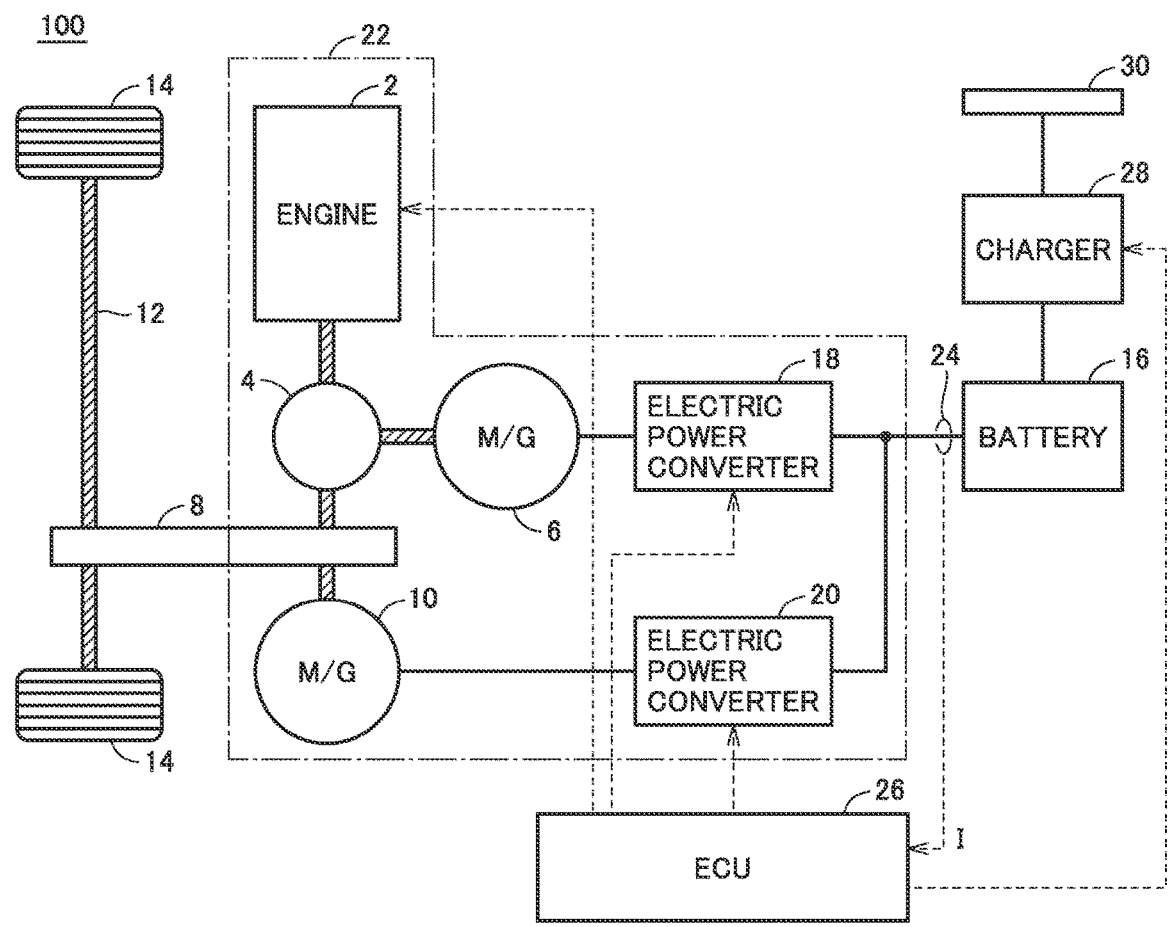
FIG. 1 is a block diagram illustrating the overall configuration of a hybrid vehicle, which is an example of an electric powered vehicle according to an embodiment of the present disclosure.

Hereinafter, an embodiment of the present disclosure will be described in detail with reference to the drawings. Note that the same or equivalent elements in the drawings will be denoted by the same reference symbols, and the description thereof will not be repeated.

FIG. 1 is a block diagram illustrating the overall configuration of a hybrid vehicle, which is an example of an electric powered vehicle according to an embodiment of the present disclosure. Referring to FIG. 1, a hybrid vehicle 100 includes a vehicle drive apparatus 22, a transmission gear 8, a drive shaft 12, wheels 14, a battery 16, and an electronic control unit (ECU) 26. Hybrid vehicle 100 further includes a charger 28 and a connection device 30.

Vehicle drive apparatus 22 is configured to generate vehicle drive power and also is able to generate electric power. Specifically, vehicle drive apparatus 22 includes an engine 2, a power split device 4, motor generators 6 and 10, and electric power converters 18 and 20.

Engine 2 is an internal combustion engine that outputs motive power by converting thermal energy produced by fuel combustion into kinetic energy of a motion device, such as a piston or a rotor. As the fuel for engine 2, a hydrocarbon fuel, such as gasoline, light oil, ethanol, or natural gas; or a liquid or gas hydrogen fuel may be employed.

Each of motor generators 6 and 10 is an alternating-current (AC) rotating electric machine, for example, a three-phase alternating current (AC) synchronous electric motor in which permanent magnets are embedded in a rotor. Motor generator 6 is used as an electric generator that is driven by engine 2 via power split device 4, and used also as an electric motor for starting engine 2. Motor generator 10 operates mainly as an electric motor, and drives drive shaft 12. When brakes are applied to hybrid vehicle 100 or when hybrid vehicle 100 travels on a downhill slope, motor generator 10 operates as an electric generator to perform regenerative power generation.

Power split device 4 includes a planetary gear mechanism having three rotary shafts of, for example, a sun gear, a carrier, and a ring gear. Power split device 4 splits the drive power generated by engine 2 into motive power to be transmitted to a rotary shaft of motor generator 6 and motive power to be transmitted to transmission gear 8. Transmission gear 8 is coupled to drive shaft 12 for driving wheels 14. Transmission gear 8 is also coupled to a rotary shaft of motor generator 10.

Battery 16 is a rechargeable secondary battery, for example, a secondary battery, such as a nickel-metal-hydride battery or a lithium-ion battery. Battery 16 supplies electric power to electric power converters 18 and 20. During electric power generation by motor generator 6 and/or motor generator 10, battery 16 is charged with the generated electric power. Furthermore, battery 16 can be charged with electric power supplied from a power source (not illustrated) external to hybrid vehicle 100 through connection device 30. A current sensor 24 detects an electric current I that is input into battery 16 or output from battery 16 (detects electric current I output from battery 16 (discharging current) as a positive value, and detects electric current I input into battery 16 (charging current) as a negative value), and outputs the detected value to ECU 26.

The remaining capacity of battery 16 is indicated by, for example, a state of charge (SOC), which is a percentage of the amount of electric power presently stored in battery 16 with respect to the fully charged state of battery 16. The SOC is calculated based on, for example, a detected value obtained by current sensor 24 and/or a detected value obtained by a voltage sensor (not illustrated). The SOC may be calculated by ECU 26 or by another ECU provided for battery 16.

Electric power converter 18 performs bidirectional DC-AC power conversion between motor generator 6 and battery 16, based on a control signal received from ECU 26. Similarly, electric power converter 20 performs bidirectional DC-AC power conversion between motor generator 10 and battery 16, based on a control signal received from ECU 26. Thus, when receiving electric power from battery 16 or supplying electric power to battery 16, each of motor generators 6 and 10 can output a positive torque for operation as an electric motor or output a negative torque for operation as an electric generator. Electric power converters 18 and 20 are, for example, inverters. A boost converter for DC voltage conversion may be disposed between battery 16 and electric power converters 18 and 20.

Charger 28 converts the electric power supplied from the power source external to hybrid vehicle 100 that is electrically connected to connection device 30 into electric power having a voltage level of battery 16, and outputs the electric power to battery 16 (hereinafter, the power source external to hybrid vehicle 100 will also be referred to as "external power source" and charging of battery 16 by the external power source will also be referred to as "external charging"). Charger 28 is configured to include, for example, a rectifier and an inverter. A method of receiving the electric power from the external power source is not limited to contact electric power reception using connection device 30, and the electric power may be wirelessly received from the external power source by using an electric power reception coil and the like, instead of connection device 30.

ECU 26 includes, for example, a central processing unit (CPU), memory devices, and an input-output buffer (none of which are illustrated), and executes various controls of devices in hybrid vehicle 100. Note that these controls may be executed by not only software processing but also processing by dedicated hardware (electronic circuit).

In the main control executed by ECU 26, ECU 26 calculates a vehicle drive torque (requested value) based on a vehicle speed and an accelerator position corresponding to the operation degree of an accelerator pedal, and calculates vehicle drive power (requested value) based on the calculated vehicle drive torque. In addition, ECU 26 further calculates requested charging power for battery 16 based on the SOC of battery 16, and controls vehicle drive apparatus 22 such that vehicle drive apparatus 22 generates power (hereinafter, referred to as "vehicle power") that corresponds to the sum of the vehicle drive power and the requested charging power.

When the vehicle power is low, ECU 26 controls vehicle drive apparatus 22 such that engine 2 is stopped and hybrid vehicle 100 travels using only motor generator 10 as a drive source (EV travelling). This causes battery 16 to discharge the electric power, so that the SOC of battery 16 is reduced. When the vehicle power is increased, ECU 26 controls vehicle drive apparatus 22 such that engine 2 is operated to cause hybrid vehicle 100 to travel (HV travelling). In this case, when the output from engine 2 is higher than the vehicle power, battery 16 is charged with the electric power, whereas when the vehicle power is higher than the output from engine 2, the electric power is discharged from battery 16.

ECU 26 controls travelling of hybrid vehicle 100 by selectively applying a mode of actively consuming the SOC of battery 16 by mainly performing the EV travelling while permitting the HV travelling (EV mode), and a mode of maintaining the SOC by switching between the HV travelling and the EV travelling as appropriate. The latter mode includes a mode of maintaining the SOC at a prescribed lower limit when the SOC decreases to the lower limit (HV mode), and a mode of maintaining the SOC higher than the lower limit in accordance with a user's request. Each mode will be described later in detail.

In addition, ECU 26 controls charger 28 such that charger 28 converts the electric power supplied from the external power source electrically connected to connection device 30 into electric power having a voltage level of battery 16, and outputs the electric power to battery 16, during execution of external charging.

Furthermore, ECU 26 calculates an evaluation value ΣD indicating the degree of deterioration (high-rate deterioration) of battery 16 due to continuous non-uniformity in the salt concentration in battery 16 due to charging or discharging of battery 16. A method of calculating the evaluation value (ΣD) will be described later in detail. The evaluation value takes a negative value when the salt concentration becomes non-uniform because battery 16 is used so as to be charged excessively, whereas takes a positive value when the salt concentration becomes non-uniform because battery 16 is used so as to be discharged excessively.

The high-rate deterioration has the property of being accelerated when the battery is used in a low-SOC range. This is because in the low-SOC range, expansion and contraction of the negative electrode of the battery become large and an electrolytic solution in a battery cell is more easily pushed out, and thus, the salt concentration in a battery cell surface more easily becomes non-uniform. Accordingly, it is conceivable to increase the SOC by raising a control target of the SOC when the high-rate deterioration is evaluated as progressing based on the evaluation value (ΣD) (hereinafter, such SOC control will be referred to as "high-rate deterioration inhibiting control").

However, if the high-rate deterioration inhibiting control is executed without any exception and the control target of the SOC is thereby raised when the high-rate deterioration is evaluated as progressing, a distance over which the EV travelling is possible can become shorter unnecessarily, or the EV travelling can become impossible.

The high-rate deterioration also has the property of being accelerated particularly when an electric current in a charging direction flows in the low-SOC range. The high-rate deterioration caused by the flow of the electric current in the charging direction turns toward recovery when an electric current in a discharging direction flows continuously.

Accordingly, in the present embodiment, ECU 26 executes the high-rate deterioration inhibiting control when the HV mode is currently selected and when the high-rate deterioration is evaluated as progressing based on the evaluation value (ΣD) (e.g., when the evaluation value is smaller than a threshold value). On the other hand, ECU 26 does not execute the high-rate deterioration inhibiting control when the EV mode is currently selected.

As a result, when the HV mode in which the high-rate deterioration is more easily accelerated due to the SOC controlled to the lower limit is currently selected, the high-rate deterioration can be effectively inhibited. On the other hand, in the EV mode in which the SOC is consumed, the ratio of discharging is greater than charging, and thus, recovery of the high-rate deterioration can be expected as a result of continuous discharging. Accordingly, the high-rate deterioration inhibiting control is not executed when the EV mode is currently selected. As a result, recovery of the high-rate deterioration can be achieved, and the EV travelling is possible until the SOC reaches the lower limit and thus the EV travelling distance can be ensured.

Figure 2:
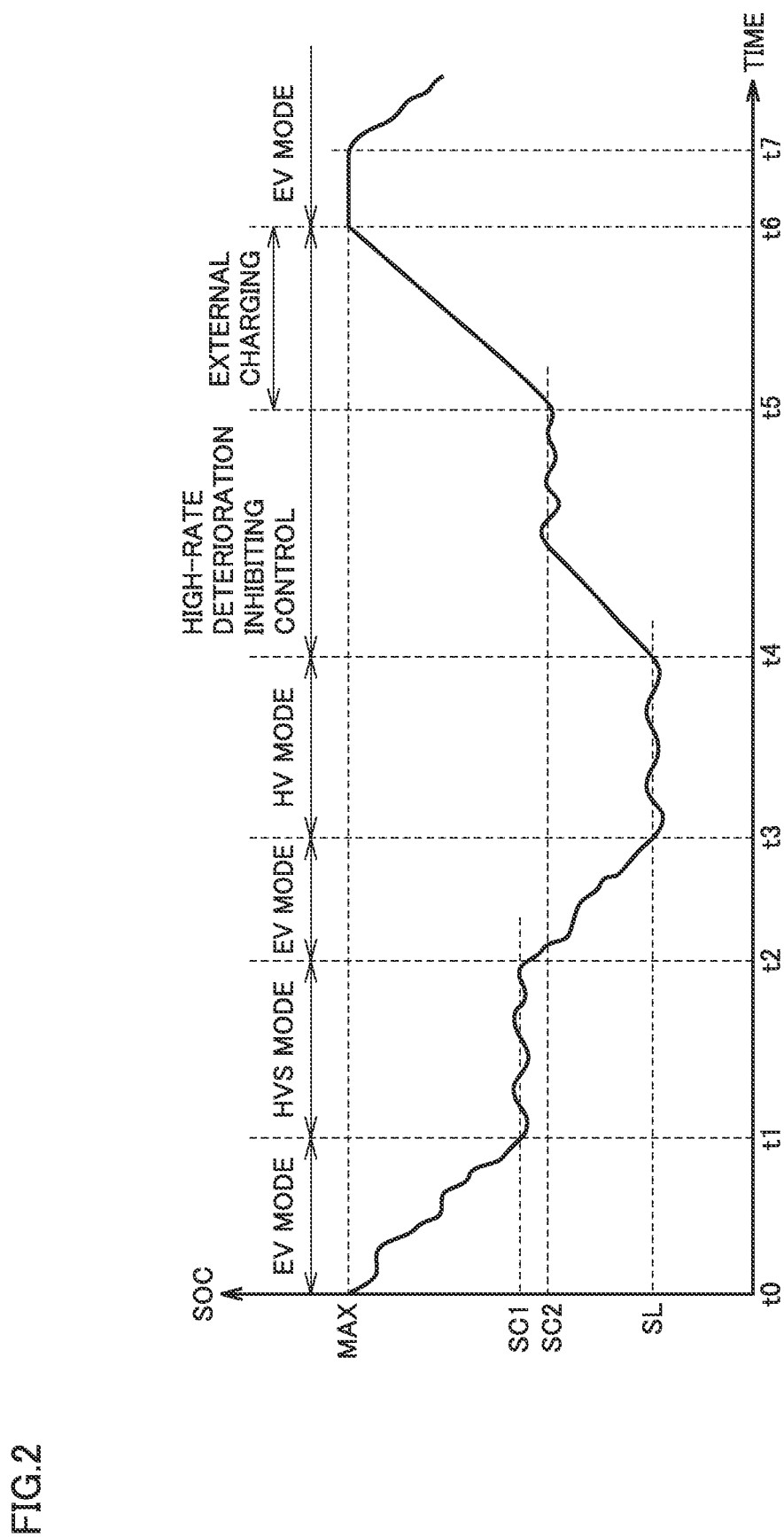
FIG. 2 is a graph illustrating an example of transition of an SOC of a battery.

FIG. 2 is a graph illustrating an example of transition of the SOC of battery 16. Referring to FIG. 2, after battery 16 reaches the fully charged state (SOC=MAX) as a result of external charging, travelling in the EV mode is started at time t0.

The EV mode is a mode in which the SOC of battery 16 is actively consumed, and basically, the electric power stored in battery 16 (mainly, electric energy generated by external charging) is consumed. During travelling in the EV mode, engine 2 does not operate for the purpose of maintaining the SOC. Specifically, the requested charging power of battery 16 is, for example, set to zero during the EV mode. As a result, although the SOC increases temporarily due to the regenerative electric power recovered, such as during deceleration of hybrid vehicle 100, and the electric power generated with operation of engine 2, the ratio of discharging is relatively greater than charging, and on the whole, the SOC decreases with an increase in travelling distance.

Even in the EV mode, engine 2 operates when the vehicle power (vehicle drive power) exceeds an engine startup threshold value. Even when the vehicle power does not exceed the engine startup threshold value, operation of engine 2 may be permitted in some cases, such as during warm-up of engine 2 and an exhaust catalyst. That is, even in the EV mode, the EV travelling and the HV travelling are possible. Such EV mode may also be referred to as "CD (Charge Depleting) mode".

When the SOC decreases to a lower limit SL at time t3, the control mode is switched from the EV mode to the HV mode (the HVS mode from time t1 to time t2 will be described below). The HV mode is a mode in which the SOC is controlled (maintained) to lower limit SL. Specifically, engine 2 operates (HV travelling) when the SOC falls below lower limit SL, and engine 2 stops (EV travelling) when the SOC increases. In this way, in the HV mode, engine 2 operates for the purpose of maintaining the SOC.

Even in the HV mode, engine 2 stops when the SOC becomes high. That is, the HV mode is not limited to the HV travelling in which hybrid vehicle 100 travels with engine 2 operating constantly. Even in the HV mode, the EV travelling and the HV travelling are possible.

The HVS mode is a mode in which the SOC is maintained higher than lower limit SL in accordance with a user's request. In this example, the user's request is made at time t1, and until time t2 at which the request is canceled, the SOC is controlled (maintained) to a value SC1 (SC1>SL) at the time of the user's request. The request for transition to the HVS mode and cancellation of the request are, for example, input by the user through an operation device (not illustrated) that can be operated by the user.

In the HVS mode, engine 2 operates (HV travelling) when the SOC falls below value SC1, and engine 2 stops (EV travelling) when the SOC increases. In this way, in the HVS mode as well, engine 2 operates for the purpose of maintaining the SOC. The HV mode and the HVS mode in which the SOC is maintained may also be collectively referred to as "CS (Charge Sustain) mode".

Even in the HVS mode, engine 2 stops when the SOC becomes high, similarly to the HV mode. That is, the HVS mode is not limited, either, to the HV travelling in which hybrid vehicle 100 travels with engine 2 operating constantly. Even in the HVS mode, the EV travelling and the HV travelling are possible.

In some embodiments, the engine startup threshold value in the EV mode is set to be larger than an engine startup threshold value in the HV mode and the HVS mode. That is, a range of the EV travelling of hybrid vehicle 100 in the EV mode is larger than a range of the EV travelling of hybrid vehicle 100 in the HV mode and the HVS mode. Thus, in the EV mode, the frequency of startup of engine 2 can be further inhibited and the opportunity for the EV travelling can be further expanded.

Figure 3:
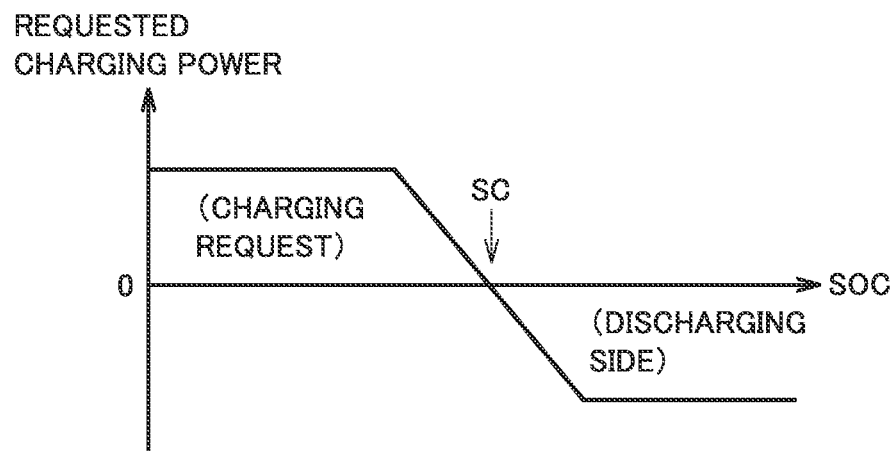
FIG. 3 is a graph illustrating the relationship between the SOC and the requested charging power.

In the HV mode and the HVS mode in which the SOC is maintained, the requested charging power of battery 16 is calculated based on the SOC of battery 16. For example, as illustrated in FIG. 3, the requested charging and discharging power of battery 16 is determined based on a difference between the SOC (calculation value) and a control target SC (lower limit SL in the HV mode, and value SC1 in the HVS mode). Vehicle drive apparatus 22 is controlled to generate the power (vehicle power) that corresponds to the sum of the vehicle drive power and the requested charging power. As a result, the SOC is controlled to be close to lower limit SL in the HV mode, and the SOC is controlled to be close to value SC1 in the HVS mode.

When the high-rate deterioration is evaluated as progressing based on the evaluation value (ΣD) of the high-rate deterioration at time t4 while the HV mode is currently selected, the high-rate deterioration inhibiting control is executed and the control target of the SOC is raised from lower limit SL to a prescribed value SC2 (SC2>SL). As one example, lower limit SL is set to approximately 20% of the SOC, whereas prescribed value SC2 is set to approximately 50% of the SOC.

Figure 4:
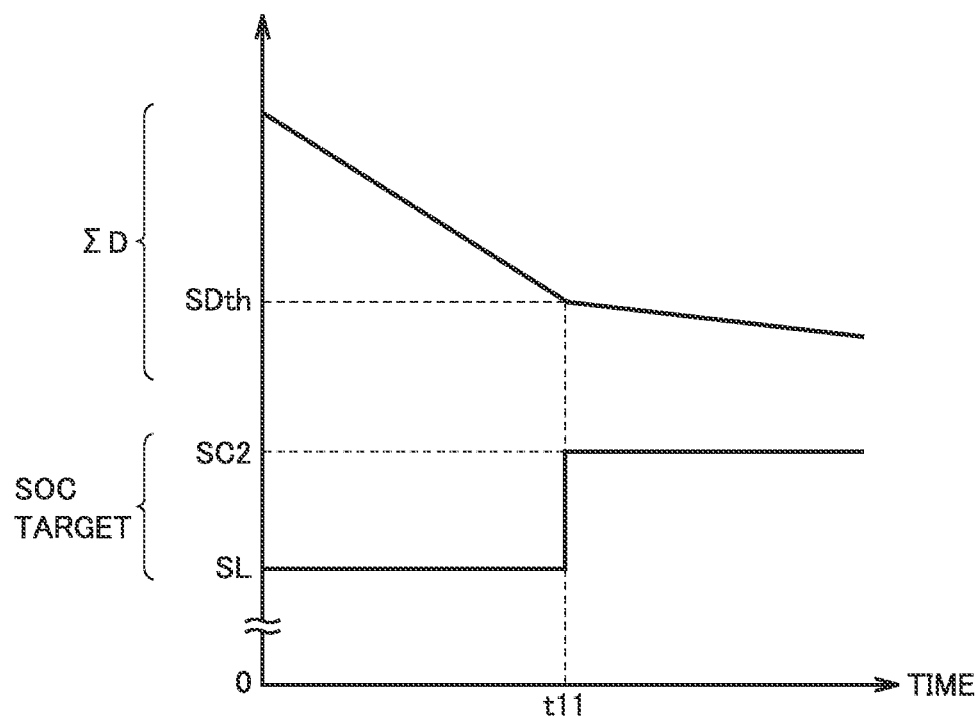
FIG. 4 is a graph illustrating an example of the relationship between an evaluation value of high-rate deterioration and an SOC target.

FIG. 4 is a graph illustrating an example of the relationship between the evaluation value (ΣD) of the high-rate deterioration and the SOC target. Referring to FIG. 4, when the evaluation value (ΣD) increases as a negative value and the evaluation value (ΣD) reaches a threshold value SDth (negative value) at time t11 while the HV mode is currently selected, the control target (target SC in FIG. 3) of the SOC is raised from lower limit SL to value SC2. As a result, the rate of increase in evaluation value (ΣD) (increase in the negative direction) is inhibited. Although not particularly illustrated, the SOC target may be raised in a stepwise manner in accordance with the increase in evaluation value (ΣD) (increase in the negative direction).

Referring again to FIG. 2, external charging is started at time t5, and the SOC increases. When battery 16 reaches the fully charged state (SOC=MAX) at time t6, external charging ends. In the present embodiment, when external charging is executed, the high-rate deterioration inhibiting control is ended if the control is in execution. That is, when external charging is executed during execution of the high-rate deterioration inhibiting control, the high-rate deterioration inhibiting control is ended regardless of the evaluation value (ΣD) (even if the evaluation value has reached threshold value SDth).

When external charging is executed, the user expects that a sufficient EV travelling distance is ensured. However, if the high-rate deterioration inhibiting control is in execution (continued), the control target of the SOC is high, and thus, the EV travelling distance can become shorter, and the user can have an uncomfortable feeling that the amount of stored electric power is insufficient when a difference between the SOC and the control target of the SOC (value SC2 when the high-rate deterioration inhibiting control is in execution) is displayed as the remaining amount of the SOC. Accordingly, in the present embodiment, when external charging is executed, the high-rate deterioration inhibiting control is ended as described above. As a result, the EV travelling distance after external charging is ensured and the user's uncomfortable feeling about display of the remaining amount of the SOC is inhibited.

At time t7, external charging ends, the high-rate deterioration inhibiting control is not in execution, and the EV mode is selected. Thus, the EV travelling distance after external charging is ensured, and recovery of the high-rate deterioration is expected as a result of the continuously performed EV travelling.

In the present embodiment, even if the evaluation value (ΣD) reaches threshold value SDth (negative value) when the HVS mode is currently selected, the high-rate deterioration inhibiting control is not executed. When the HVS mode is currently selected, the SOC is maintained higher than lower limit SL, and thus, progress of the high-rate deterioration is inhibited. In addition, the HVS mode may be selected, for example, when it is desirable to ensure the SOC to make the subsequent EV travelling possible. If the high-rate deterioration inhibiting control is in execution in such a case, the control target of the SOC is high, and thus, the EV travelling distance can become shorter, or the EV travelling can become impossible. Accordingly, as described above, in the present embodiment, when the HVS mode is currently selected, the high-rate deterioration inhibiting control is not executed.

Figure 5:
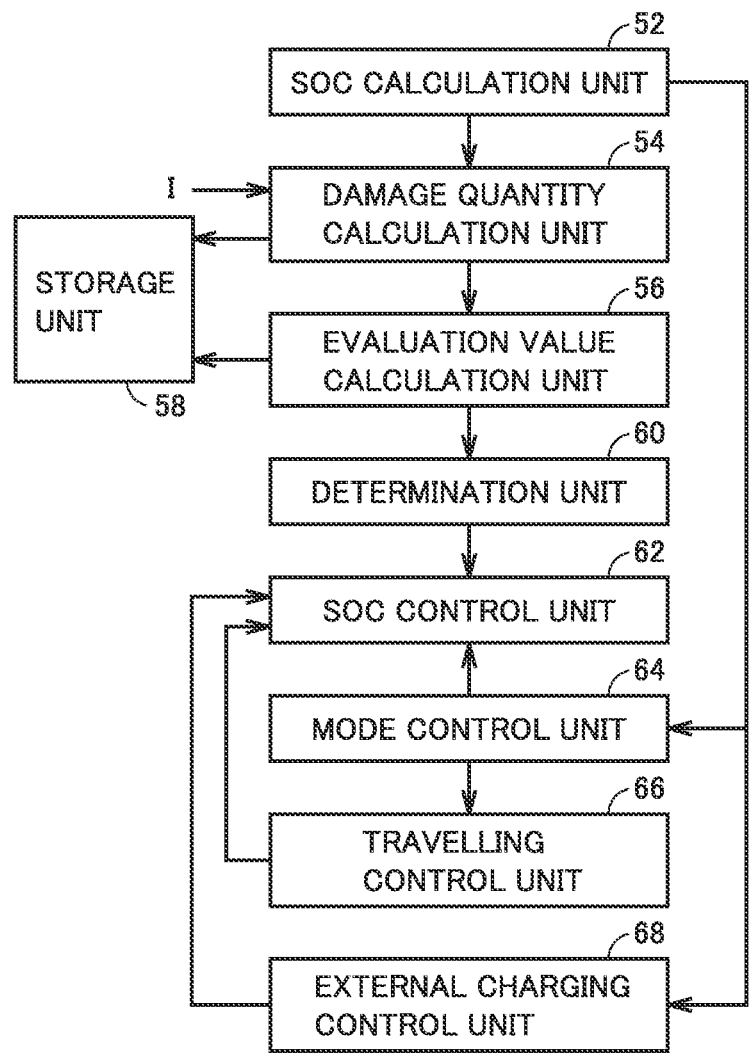
FIG. 5 is a functional block diagram of an ECU illustrated in FIG. 1.

FIG. 5 is a functional block diagram of ECU 26 illustrated in FIG. 1. Referring to FIG. 5, ECU 26 includes an SOC calculation unit 52, a damage quantity calculation unit 54, an evaluation value calculation unit 56, a storage unit 58, a determination unit 60, an SOC control unit 62, a mode control unit 64, a travelling control unit 66, and an external charging control unit 68.

SOC calculation unit 52 calculates the SOC of battery 16 based on electric current I of battery 16 that is detected by current sensor 24 (FIG. 1) and/or the voltage of battery 16 that is detected by a voltage sensor (not illustrated). Various known methods such as a method using an integrated value of electric currents I and a method using an OCV-SOC curve indicating the relationship between an open circuit voltage (OCV) of battery 16 and the SOC of battery 16 may be used as a concrete method of calculating the SOC.

Damage quantity calculation unit 54 calculates a damage quantity D of battery 16 due to non-uniformity in the salt concentration in battery 16, based on electric current I that is input into battery 16 or that is output from battery 16 and the time of application of electric current I. Damage quantity D is calculated in a prescribed cycle Δt based on, for example, Expression (1) indicated below.

$$D(N)=D(N-1)-\alpha \times \Delta t \times D(N-1)+(\beta/C) \times I \times \Delta t \quad (1)$$

In Expression (1), D(N) denotes a present calculation value of damage quantity D, and D(N−1) denotes an immediately preceding calculation value of damage quantity D that is calculated cycle Δt before the present calculation. D(N−1) is stored in storage unit 58 at the time of immediately preceding calculation, and read from storage unit 58 at the time of present calculation.

The second term on the right side in Expression (1), that is, α×Δt×D(N−1), is a reduction term of damage quantity D, and indicates a component when the degree of non-uniformity in the salt concentration is reduced, α is a forgetting coefficient, and is a coefficient corresponding to the diffusion velocity of ions in the electrolytic solution of battery 16. Forgetting coefficient α becomes larger as the diffusion velocity becomes higher. The value of α×Δt is set so as to be within a range from 0 to 1. The reduction term of damage quantity D takes a larger value as forgetting coefficient α is larger (i.e., as the diffusion velocity of ions is higher), or as cycle Δt is longer.

Forgetting coefficient α depends on the SOC of battery 16 or the temperature of battery 16. The correlation between forgetting coefficient α, and the SOC and temperature of battery 16 is obtained in advance by, for example, experiments, and stored in storage unit 58. Then, forgetting coefficient α is set based on the SOC and temperature of battery 16 at the time of calculation. For example, when the temperature of battery 16 is constant, forgetting coefficient α is set to a larger value as the SOC of battery 16 is higher, whereas when the SOC of battery 16 is constant, forgetting coefficient α is set to a larger value as the temperature of battery 16 is higher.

The third term on the right side in Expression (1), that is, $(\beta/C) \times I \times \Delta t$, is an increase term of damage quantity D, and indicates a component when the non-uniformity in the salt concentration occurs. $\beta$ is a current coefficient, and C denotes a limit threshold. The increase term of damage quantity D takes a larger value as electric current I is higher, or as cycle $\Delta t$ is longer.

Current coefficient $\beta$ and limit threshold C depend on the SOC of battery 16 and the temperature of battery 16. The correlation between each of current coefficient $\beta$ and limit threshold C, and the SOC and temperature of battery 16 is obtained in advance by, for example, experiments, and stored in storage unit 58. Then, current coefficient $\beta$ and limit threshold C are set based on the SOC and temperature of battery 16 at the time of calculation. For example, when the temperature of battery 16 is constant, limit threshold C is set to a larger value as the SOC of battery 16 is higher, whereas when the SOC of battery 16 is constant, limit threshold C is set to a larger value as the temperature of battery 16 is higher.

As described above, the occurrence of non-uniformity in the salt concentration and reduction in the degree of non-uniformity in the salt concentration are expressed respectively by the above-described increase term and reduction term, and present damage quantity D is calculated using the increase term and the reduction term. This makes it possible to appropriately acquire variations (increase and decrease) in the degree of non-uniformity in the salt concentration, which is considered to be a factor of high-rate deterioration.

Evaluation value calculation unit 56 calculates an evaluation value $\Sigma D$ that indicates the degree of high-rate deterioration of battery 16. The progress state of high-rate deterioration is evaluated using an integrated value of damage quantities D calculated by damage quantity calculation unit 54. Evaluation value $\Sigma D$ is calculated based on, for example, Expression (2) indicated below.

$$\Sigma D(N) = \gamma \times \Sigma D(N-1) \times \eta \times D(N) \quad (2)$$

In Expression (2), $\Sigma D(N)$ denotes a present calculation value of the evaluation value, and $\Sigma D(N-1)$ denotes an immediately preceding calculation value of the evaluation value that is calculated cycle $\Delta t$ before the present calculation. $\gamma$ is an attenuation coefficient, and $\eta$ is a correction coefficient. $\Sigma D(N-1)$ is stored in storage unit 58 at the time of immediately preceding calculation, and read from storage unit 58 at the time of present calculation. Attenuation coefficient $\gamma$ and correction coefficient $\eta$ are stored in advance in storage unit 58, and read from storage unit 58 at the time of present calculation.

Attenuation coefficient $\gamma$ is set to a value less than one. Attenuation coefficient $\gamma$ is set in this way in view of the fact that immediately preceding evaluation value $\Sigma D(N-1)$ is decreased at the time of calculation of present evaluation value $\Sigma D(N)$ because the degree of non-uniformity in the salt concentration is reduced by the diffusion of ions with the lapse of time. Correction coefficient ii is set as appropriate.

When battery 16 is used so as to be charged excessively, evaluation value $\Sigma D$ calculated in the above-described manner increases in the negative direction (negative value) with an increase in the degree of non-uniformity in the salt concentration due to excessive charging. When battery 16 is used so as to be discharged excessively, evaluation value $\Sigma D$ increases in the positive direction (positive value) with an increase in the degree of non-uniformity in the salt concentration due to excessive discharging.

Determination unit 60 determines whether or not evaluation value $\Sigma D$ calculated by evaluation value calculation unit 56 reaches threshold value SDth (FIG. 4). As described above, the high-rate deterioration has the property of being accelerated particularly when the electric current in the charging direction flows in the low-SOC range. Specifically, determination unit 60 determines whether or not evaluation value $\Sigma D$ increases in the negative direction and falls below threshold value SDth (negative value).

Mode control unit 64 controls switching among the EV mode, the I-IV mode and the HVS mode. Specifically, when external charging ends, mode control unit 64 selects the EV mode. When the SOC decreases to lower limit SL as a result of travelling in the EV mode, mode control unit 64 switches the control mode from the EV mode to the HV mode. In addition, mode control unit 64 selects the HVS mode in accordance with the user's request. When the above-described request is made during the EV mode, the SOC is maintained at the value at this time. When the above-described request is made during the HV mode, the SOC may be maintained at a value higher than lower limit SL by a prescribed amount, or switching to the HVS mode may be made impossible, for example.

SOC control unit 62 receives the mode selection information from mode control unit 64, and also receives the result of determination made by determination unit 60 from determination unit 60. When the HV mode is currently selected and when it is determined in determination unit 60 that evaluation value $\Sigma D$ reaches threshold value SDth, SOC control unit 62 raises the control target of the SOC from lower limit SL to value SC2 (SC2>SL) (high-rate deterioration inhibiting control).

Travelling control unit 66 calculates the vehicle drive power (requested value) based on the vehicle speed and the accelerator position. Travelling control unit 66 receives the mode selection information from mode control unit 64, and further calculates the requested charging power of battery 16 based on the SOC (FIG. 3) when the HV mode or the HVS mode is currently selected, and calculates the vehicle power that corresponds to the sum of the vehicle drive power and the requested charging power. When the EV mode is currently selected, travelling control unit 66 uses the vehicle drive power as the vehicle power.

When the vehicle power is lower than the engine startup threshold value, travelling control unit 66 controls vehicle drive apparatus 22 to perform the EV travelling. On the other hand, when the vehicle power is equal to or higher than the engine startup threshold value, travelling control unit 66 controls vehicle drive apparatus 22 to operate engine 2 and perform the HV travelling. In this case, when the output from engine 2 is higher than the vehicle power, battery 16 is charged with the electric power, whereas when the vehicle power is higher than the output from engine 2, the electric power is discharged from battery 16.

When brakes are applied to hybrid vehicle 100 or when hybrid vehicle 100 travels on a downhill slope, travelling control unit 66 controls vehicle drive apparatus 22 (motor generator 10 and electric power converter 20) such that motor generator 10 generates electric power and generates braking power.

SOC control unit 62 obtains the situation of electric power generation by vehicle drive apparatus 22 from travelling control unit 66. When electric power generation by vehicle drive apparatus 22 continues for a prescribed time period, SOC control unit 62 ends the high-rate deterioration inhibiting control if the high-rate deterioration inhibiting control is in execution. For example, when regenerative power generation by motor generator 10 continues for a prescribed time period due to continuous travelling on a downhill slope, the high-rate deterioration inhibiting control is ended.

When travelling on a downhill slope continues, the user expects that a sufficient amount of electric power is recovered and a sufficient EV travelling distance is ensured. However, if the high-rate deterioration inhibiting control is in execution (continued), the control target of the SOC is high, and thus, the EV travelling distance can become shorter, and the user can have an uncomfortable feeling about display of the remaining amount of the SOC as described above. Accordingly, in the present embodiment, when electric power generation by vehicle drive apparatus 22 (mainly, regenerative power generation by motor generator 10) continues for the prescribed time period, the high-rate deterioration inhibiting control is ended, and thus, the EV travelling distance after the lapse of the prescribed time period is ensured.

When a prescribed charging execution condition is satisfied during connection of the external power source to connection device 30, external charging control unit 68 executes external charging. Specifically, external charging control unit 68 controls charger 28 such that charger 28 converts the electric power supplied from the external power source electrically connected to connection device 30 into electric power having a voltage level of battery 16 and outputs the electric power to battery 16.

When SOC control unit 62 receives, from external charging control unit 68, a notification that external charging has been executed, SOC control unit 62 ends the high-rate deterioration inhibiting control if the high-rate deterioration inhibiting control is in execution. Similarly to after continuous travelling on a downhill slope, the user expects that a sufficient EV travelling distance is ensured after external charging. Accordingly, in the present embodiment, when external charging is executed, the high-rate deterioration inhibiting control is ended, and thus, the EV travelling distance after external charging is ensured.

Figure 6:
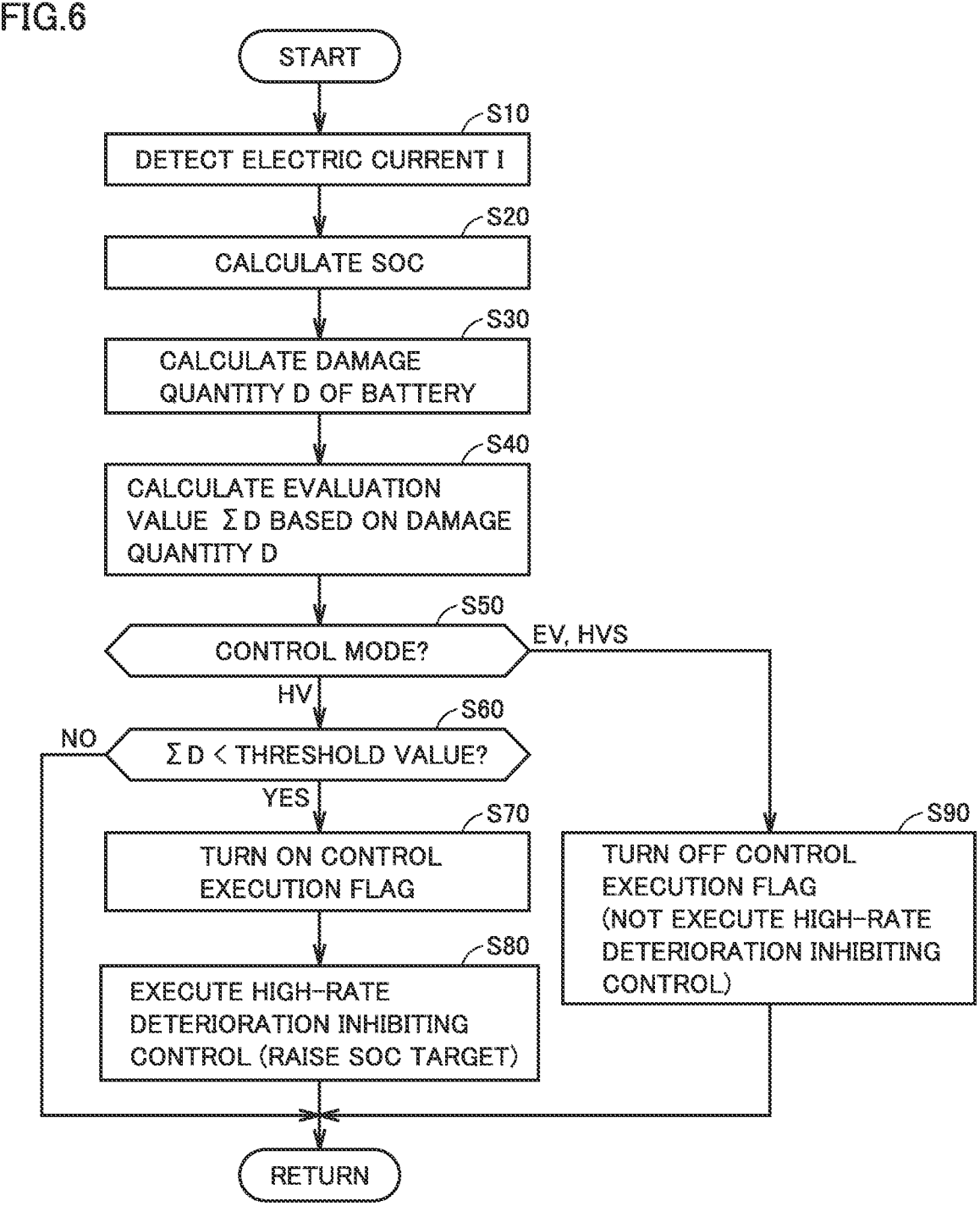
FIG. 6 is a flowchart illustrating an example of the process procedure of high-rate deterioration inhibiting control executed by the ECU.

FIG. 6 is a flowchart illustrating an example of the process procedure of the high-rate deterioration inhibiting control executed by ECU 26. The process illustrated in the flowchart is invoked from a main routine and executed in prescribed cycle $\Delta t$.

Referring to FIG. 6, ECU 26 detects electric current I that is input into battery 16 or that is output from battery 16, using current sensor 24 (step S10). Next, ECU 26 calculates the SOC of battery 16 (step S20). Note that the SOC may be calculated by various known methods.

Subsequently, ECU 26 calculates damage quantity D of battery 16 based on electric current I detected in step S10 and the SOC calculated in step S20, by using Expression (1) described above (step S30). Then, ECU 26 calculates evaluation value $\Sigma D$ indicating the degree of high-rate deterioration of battery 16 based on damage quantity D calculated in step S30, by using Expression (2) described above (step S40).

Next, ECU 26 determines which control mode of the EV mode, the HV mode and the HVS mode is currently selected (step S50). When it is determined that the HV mode is currently selected ("HV" in step S50), ECU 26 determines whether or not evaluation value $\Sigma D$ is smaller than threshold value SDth (negative value) (step S60).

When it is determined that evaluation value $\Sigma D$ is smaller than the threshold value (YES in step S60), ECU 26 turns on a control execution flag indicating execution of the high-rate deterioration inhibiting control (step S70), and raises the control target of the SOC from lower limit SL to value SC2 (FIG. 2) (step S80). As a result, the SOC increases from lower limit SL and the high-rate deterioration is inhibited.

When it is determined in step S60 that evaluation value $\Sigma D$ is equal to or greater than threshold value SDth (evaluation value $\Sigma D$ does not reach threshold value SDth) (NO in step S60), the process returns without executing steps S70 and S80.

When it is determined in step S50 that the EV mode or the HVS mode is currently selected ("EV, HVS" in step S50), ECU 26 turns off the control execution flag (step S90). That is, when the EV mode or the HVS mode is currently selected, the high-rate deterioration inhibiting control is not executed.

FIG. 7 is a flowchart illustrating an example of determination as to whether or not to end the high-rate deterioration inhibiting control. The process illustrated in the flowchart is invoked from a main routine and executed in prescribed cycle $\Delta t$.

Referring to FIG. 7, ECU 26 determines whether or not the control execution flag indicating execution of the high-rate deterioration inhibiting control is on (step S110). When the control execution flag is already off (NO in step S110), the high-rate deterioration inhibiting control is not in execution, and thus, the process returns.

When it is determined in step S110 that the control execution flag is on (YES in step S110), ECU 26 determines whether or not external charging has been executed (step S120). For example, when a connection device (such as a connector) on the external power source side is detached from connection device 30 (FIG. 1), it is determined that external charging has been executed.

When it is determined that external charging has been executed (YES in step S120), ECU 26 turns off the control execution flag (step S150). As a result, the high-rate deterioration inhibiting control is ended. Therefore, the target of the SOC returns from value SC2 (FIG. 2) to normal lower limit SL.

When it is determined in step S120 that external charging is not executed (NO in step S120), ECU 26 determines whether or not electric power generation by vehicle drive apparatus 22 has continued for the prescribed time period (step S130). For example, when regenerative power generation by motor generator 10 continues for the prescribed time period due to continuous travelling on a downhill slope, it is determined that electric power generation has continued for the prescribed time period. The determination in step S120 that external charging is not executed includes the case in which external charging is not started.

When it is determined in step S130 that electric power generation by vehicle drive apparatus 22 has continued for the prescribed time period (YES in step S130), ECU 26 moves the process to step S150 and turns off the control execution flag. That is, similarly, when electric power generation by vehicle drive apparatus 22 continues for the prescribed time period, the high-rate deterioration inhibiting control is ended and the target of the SOC returns to lower limit SL.

When it is determined in step S130 that electric power generation by vehicle drive apparatus 22 does not continue for the prescribed time period (NO in step S130), ECU 26 determines whether or not the SOC is higher than a prescribed value (step S140). The prescribed value is set to a level at which recovery of the high-rate deterioration can be expected as a result of continuous discharging in the subsequent EV mode, even when the high-rate deterioration inhibiting control is ended.

When it is determined in step S140 that the SOC is higher than the prescribed value (YES in step S140), ECU 26 moves the process to step S150 and turns off the control execution flag. That is, the high-rate deterioration inhibiting control is ended and the target of the SOC returns to lower limit SL. Assumed as such a case is, for example, a case in which electric power generation by vehicle drive apparatus 22 is executed during the high-rate deterioration inhibiting control and the SOC recovers to a high level, although the electric power generation does not continue for the prescribed time period.

As described above, in the present embodiment, when the HV mode is currently selected and when battery 16 is evaluated as deteriorating based on evaluation value $\Sigma D$ of the high-rate deterioration, the high-rate deterioration inhibiting control for increasing the SOC by making the control target of the SOC higher than the lower limit of the SOC is executed. This makes it possible to inhibit acceleration of the high-rate deterioration due to the SOC controlled to the lower limit.

When the EV mode is currently selected, the high-rate deterioration inhibiting control is not executed even if evaluation value $\Sigma D$ reaches the threshold value. As a result, the EV travelling is possible until the SOC reaches the lower limit, and thus, the EV travelling distance can be ensured.

In addition, in the present embodiment, when the HVS mode is currently selected, the high-rate deterioration inhibiting control is not executed. This makes it possible to inhibit progress of the high-rate deterioration and ensure the EV travelling distance.

In addition, in the present embodiment, when external charging is executed or when electric power generation by vehicle drive apparatus 22 continues for the prescribed time period, the high-rate deterioration inhibiting control is ended. This makes it possible to ensure the EV travelling distance after external charging or after continuous travelling on a downhill slope and inhibit the user's uncomfortable feeling about display of the remaining amount of the SOC.

In the above-described embodiment, charger 28 configured to convert the electric power supplied from the external power source into electric power having a voltage level of battery 16 is provided. However, such charger 28 does not need to be provided and battery 16 may be directly (without power conversion) charged using a DC external power source.

In addition, in the above-described embodiment, when the HVS mode is currently selected, the high-rate deterioration inhibiting control is not executed. However, a condition for the SOC may be included. For example, the high-rate deterioration inhibiting control may be ended if the SOC is higher than a prescribed value when the HVS mode is currently selected, and the high-rate deterioration inhibiting control may be continued if the SOC is equal to or lower than the prescribed value when the HVS mode is currently selected.

While the embodiment of the present disclosure has been described above, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An electric powered vehicle comprising:
   a vehicle drive apparatus configured to generate vehicle drive power by receiving electric power and to generate electric power;
   a secondary battery configured to exchange electric power with the vehicle drive apparatus; and
   a controller configured to switch a control mode to an HV mode when an SOC of the secondary battery decreases to a lower limit during an EV mode, the HV mode being a mode in which the SOC is controlled to the lower limit, the EV mode being a mode in which the SOC is consumed,
   the controller being further configured:
      to calculate an evaluation value indicating a degree of deterioration of the secondary battery due to non-uniformity in salt concentration in the secondary battery;
      to execute deterioration inhibiting control when the HV mode is selected and when the secondary battery is evaluated as deteriorating based on the evaluation value, the deterioration inhibiting control being control for increasing the SOC by making a control target of the SOC higher than the lower limit; and
      not to switch, when the EV mode is selected, the control mode to the HV mode until the SOC decreases to the lower limit even when the secondary battery is evaluated as deteriorating based on the evaluation value.

2. The electric powered vehicle according to claim 1, wherein
   the controller is further configured:
   to switch the control mode to an HVS mode in which the SOC is maintained higher than the lower limit in accordance with a user's request; and
   not to switch, when the HVS mode is selected, the control mode to the HV mode until the SOC decreases to the lower limit even when the secondary battery is evaluated as deteriorating based on the evaluation value.

3. The electric powered vehicle according to claim 1, further comprising
   a charging device configured to charge the secondary battery by a power source external to the vehicle, wherein when charging of the secondary battery using the charging device is executed, the controller is configured to end the deterioration inhibiting control if the deterioration inhibiting control is in execution.

4. The electric powered vehicle according to claim 1, wherein when electric power generation by the vehicle drive apparatus continues for a prescribed time period, the controller is configured to end the deterioration inhibiting control if the deterioration inhibiting control is in execution.

5. A control method for an electric powered vehicle, the electric powered vehicle comprising: a vehicle drive apparatus configured to generate vehicle drive power by receiving electric power and to generate electric power; and a secondary battery configured to exchange electric power with the vehicle drive apparatus, the electric powered vehicle being configured to switch a control mode to an HV mode when an SOC of the secondary battery decreases to a lower limit during an EV mode, the HV mode being a mode in which the SOC is controlled to the lower limit, the EV mode being a mode in which the SOC is consumed, the control method comprising:
   calculating an evaluation value indicating a degree of deterioration of the secondary battery due to non-uniformity in salt concentration in the secondary battery; and
   executing deterioration inhibiting control when the HV mode is selected and when the secondary battery is evaluated as deteriorating based on the evaluation value, the deterioration inhibiting control being control for increasing the SOC by making a control target of the SOC higher than the lower limit, the control mode being not switched, when the EV mode is selected, to the HV mode until the SOC decreases to the lower limit even when the secondary battery is evaluated as deteriorating based on the evaluation value.

* * * * *